United States Patent [19]

Seragnoli

[11] 4,147,013

[45] Apr. 3, 1979

[54] DEVICE FOR TRANSFERRING SOFT CAKE-SHAPED PRODUCTS FROM A FIRST TO A SECOND CONVEYOR

[75] Inventor: Enzo Seragnoli, Bologna, Italy

[73] Assignee: G.D. Societa per Azioni, Bologna, Italy

[21] Appl. No.: 900,116

[22] Filed: Apr. 26, 1978

[30] Foreign Application Priority Data

Jul. 6, 1977 [IT] Italy ................................ 3495 A/77

[51] Int. Cl.$^2$ ......................... B65B 57/14; B65B 57/16
[52] U.S. Cl. ......................................... 53/494; 53/497; 53/247; 198/486
[58] Field of Search ................. 53/493, 494, 497, 244, 53/247; 198/486

[56] References Cited

U.S. PATENT DOCUMENTS

| 3,614,853 | 10/1971 | Seragnoli | 53/493 X |
|---|---|---|---|
| 3,974,919 | 8/1976 | Bokalders et al. | 53/494 X |

*Primary Examiner*—Travis S. McGehee

*Attorney, Agent, or Firm*—Fitzpatrick, Cella, Harper & Scinto

[57] ABSTRACT

An improved transfer device for transferring soft cake-shaped products, and soap cakes in particular, from one conveyor to another conveyor, which device comprises a sliding member reciprocatingly moved along a horizontal guide parallel to said one conveyor, and an oscillating arm associated to said sliding member to cause a vertical and reciprocating movement of sucker means carried by said sliding member. A locking device is provided for locking said oscillating arm in its upwardly directed position when sensing means, positioned near the drawing area of said one conveyor, detects an irregular sequence of products. An intercepting bar means, positioned at the end of said one conveyor and near said drawing area, is cyclically moved from an intercepting to a disengaging position, and viceversa, to intercept the irregularly supplied products and to hold them in the sucker means drawing area so as to be correctly sucked by said sucker means during the next machine cycle.

7 Claims, 7 Drawing Figures

DEVICE FOR TRANSFERRING SOFT CAKE-SHAPED PRODUCTS FROM A FIRST TO A SECOND CONVEYOR

BACKGROUND OF THE INVENTION

The present invention relates to an improved device for transferring soft cake-shaped products from a first to a second conveyor, and more particularly to a device for transferring successively manufactured soap cakes from an unidirectionally and continuously moved delivery conveyor of a soap manufacturing machine to an unidirectionally stepwise moved feeding conveyor of a soap wrapping machine.

After molding, the still soft soap cakes are laid down, by means making part of the manufacturing machine, onto the delivery conveyor of the same manufacturing machine and, from said later conveyor, transferred onto the feeding conveyor of the wrapping machine.

The time lapsed between the molding of the cakes and the transferring of the same onto the wrapping machine feeding conveyor is very short and, in any case, not long enough to allow the cakes to harden.

The transferring operation of the still soft soap cakes from one to another conveyor has to be carried out with utmost delicacy, which is not the case for the conventional transfer devices.

The drawbacks of said conventional transfer devices is that they subject the still soft cakes, in particular, to impacts which cause damages of the cakes and slow down the production with consequent undue increase of the cost and waste of material.

SUMMARY OF THE INVENTION

The object of the invention is to provide a device for transferring soft cake-shaped products, soap cakes in particular, from a first to a second conveyor which embodies the advantages but avoids the drawbacks of the conventional devices.

The transfer device of the present invention is utilized in a plant substantially comprising at least one soft cake-shaped product manufacturing machine and a wrapping machine for successively wrapping said cake-shaped products, a first unidirectionally continuously moved delivery conveyor of the manufacturing machine, a second unidirectionally stepwise moved feeding conveyor of the wrapping machine, and means for regulating the speed of said wrapping machine for balancing the output of the later machine with the out-put of the manufacturing machine.

The device comprises sucker means for transferring the cake-shaped products from a drawing area near the tailing portion of said first conveyor to a delivery area near the leading portion of said second conveyor, intercepting bar means positioned at the end of said first conveyor, sensor means positioned adjacent said drawing area for sensing the regular sequence of products on said first conveyor, suction and compression means for cyclically connecting said sucker means alternatively to a suction and to a compressed air source, a sliding member reciprocatingly sliding along at least a stationary and horizontal guide means parallel to said first conveyor, vertical guide means secured to said sliding member for the vertical shifting of said sucker means, a first kinematic motion for reciprocatingly sliding said sliding member along said horizontal guide means, a second kinematic motion for reciprocatingly shifting said sucker means along said vertical guide means, a locking device for locking said vertical reciprocating shifting of the sucker means on its upwardly directed position when said sensor means detects an irregular sequence of products on said first conveyor, and a third kinematic motion for cyclically shifting said intercepting bar means from a first substantially vertical intercepting position for intercepting products on said first conveyor to a second inclined disengaged position, and viceversa.

The novel features which are considered as characteristic of the invention are set forth in particular in the appended claims. The improved device itself, however, both as its construction and its mode of operation, together with additional features and advantages thereof, will be best understood upon perusal of the following detailed description of a preferred embodiment with reference to the accompanying drawings.

DESCRIPTION OF THE PREFERRED EMBODIMENT

Figure 1:
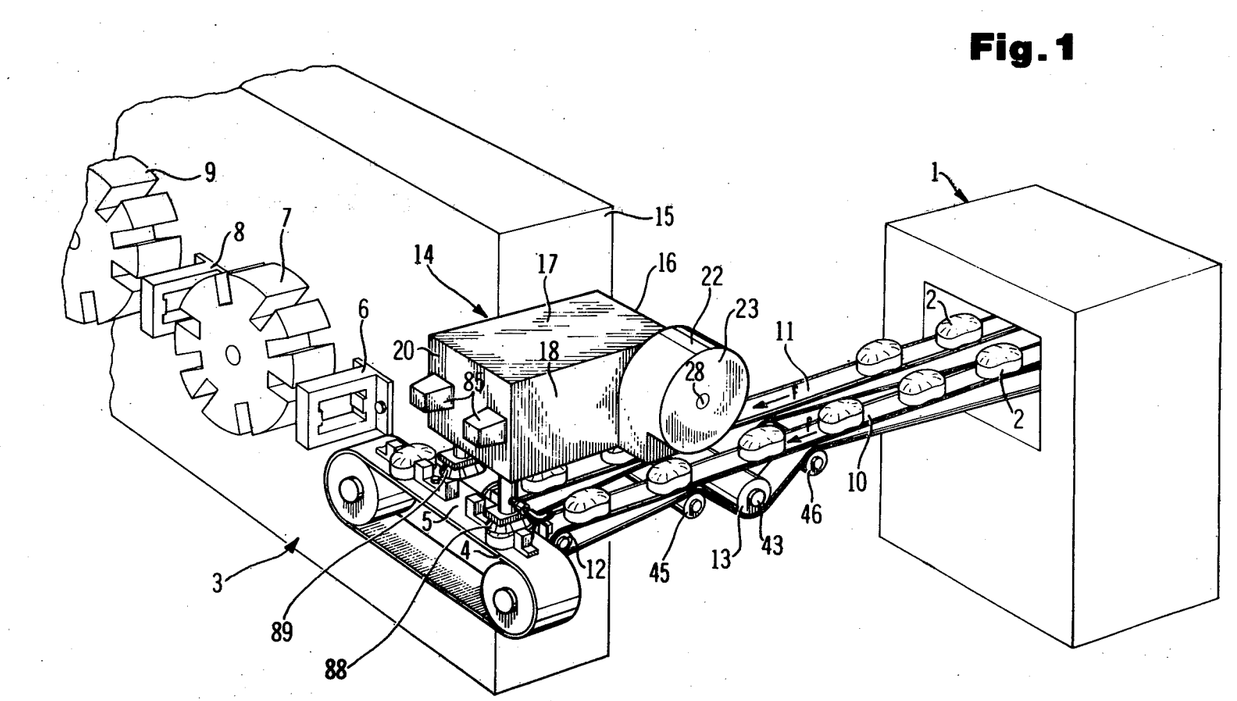
FIG. 1 is a diagrammatic and perspective view of a plant comprising a soap manufacturing machine, a soap wrapping machine, and the conveyor means connecting said machine.

With particular reference to FIG. 1, with 1 is generically and schematically indicated a manufacturing machine for manufacturing soap cakes 2, with 3 is generically indicated a soap wrapping machine of the type known on the trade with the symbol 6000 BOX (Italian Pat. No. 984.891 in the name of the same Applicant as herein), comprising an unidirectionally stepwise moved endless belt conveyor 4, having compartments 5, for feeding the soap cakes 2 to wrapping means substantially including a first stationary prefolding device 6, a first wrapping wheel 7 for wrapping the cakes 2 into an inner board wrap, a second stationary prefolding device 8, and a second wrapping wheel 9 for completing the wrapping with an outer wrap or label.

Figure 2:
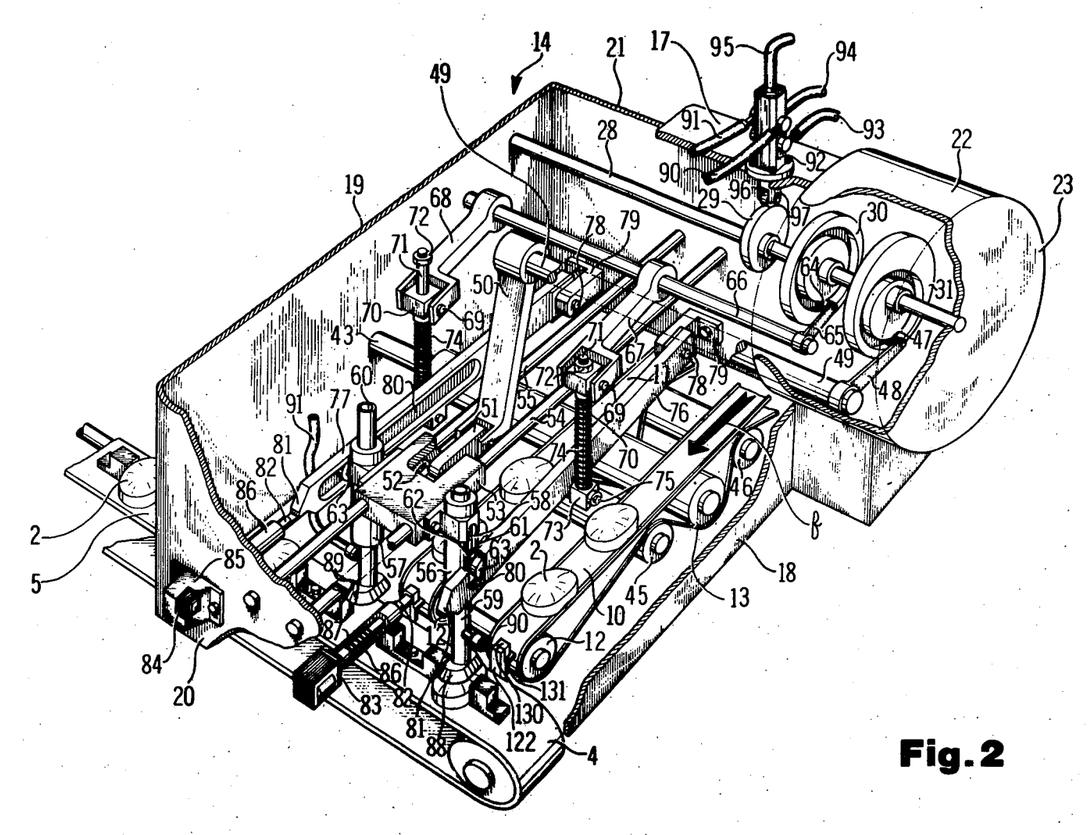
FIG. 2 shows the device according to the invention in an enlarged scale, in a perspective view and with some part cutaway or removed for a better showing of other parts.

The machines 1 and 3 are interconnected, in the embodiment shown, by a pair of endless belt conveyors 10 and 11, coplanar and side by side positioned. The endless belts 10, 11 are conventionally ring-wound about idle rollers 12 (only one is shown in FIGS. 1 and 2) and are continuously and synchronously driven in the direction of arrows f by a driving roller 13 driven, as it will be described thereinafter, by the motor of the wrapping machine 3. With 14 is generically indicated the improved transfer device according to the present invention.

As shown in FIGS. 1 and 2, the transfer device 14 is housed into a box shaped casing 16 supported by a side wall 15 of the machine 3, above the tailing portions of the conveyors 10,11 and of the leading portion of the conveyor 4.

The casing 16 substantially comprises an upper horizontal plate or cover 17, two side walls 18,19 transversally disposed relative to conveyor 4, and front and rear walls 20,21 parallelly disposed relative to the same conveyor 4. The bottom side of casing 16 is open for allowing the passage of members, thereinafter described making part of the transfer device 14. A cylindrical body 22 protrudes from the side wall 18 and is closed by a cover plate 23.

As particularly shown in FIG. 3 the transfer device 14 is driven by a continuously rotating horizontal shaft 24 making part of the wrapping machine 3 contained in the basement or bed of said later machine and sideways protruding from the wall 15.

Figure 3:
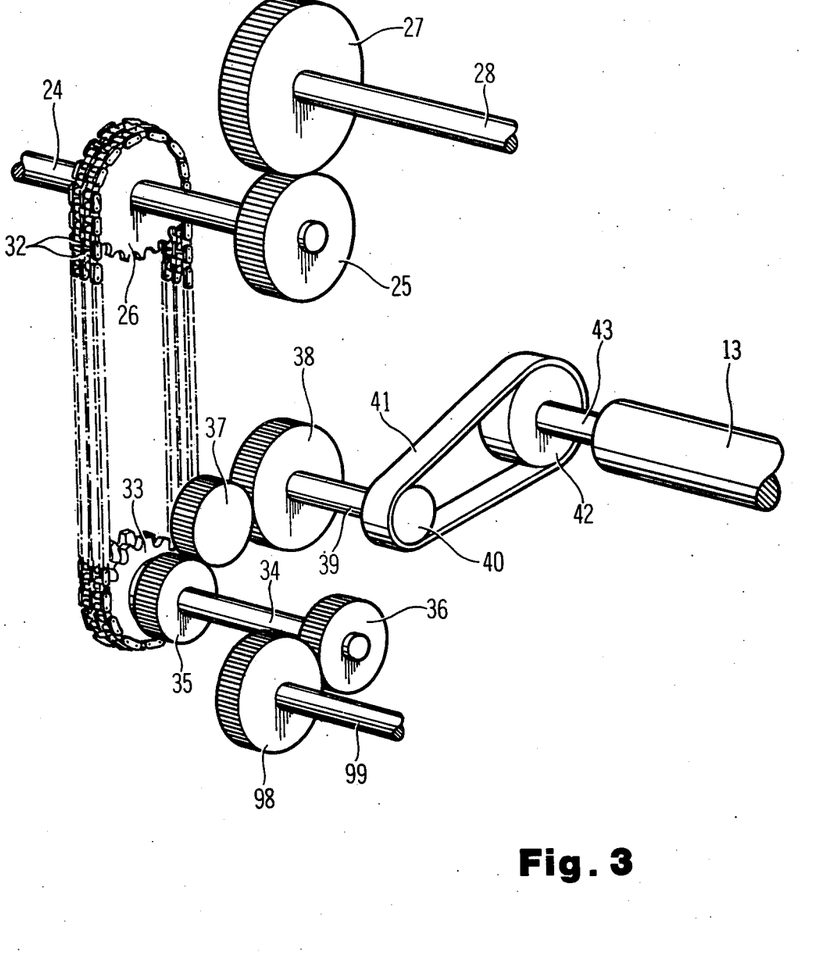
FIG. 3 is a perspective view of the drive kinematic chain of the device according to the invention.

On shaft 24 are keyed, starting from the left viewing FIG. 3, a sprocket wheel 26 and a gear 25. The gear 25 meshes with a gear 27 keyed on a shaft 28, parallel to shaft 24, passing across the side walls 19 and supported at the right end by the cover plate 23. The sprocket wheel 26 engages chains 32 for rotating a horizontal shaft 34, parallel to shaft 28, by means of a further sprocket wheel 33 keyed on the left end of said shaft 34. On shaft 34 are also keyed a gear 35 and, on its right end, another gear 36. Gear 35 drives in rotation, through an idle gear 37, a gear 38 keyed on the left end of a shaft 39, parallel to shaft 34, on the right end of which is keyed a pulley 40 cooperating with an endless belt 41 for continuously rotating a horizontal shaft 43, parallel to shaft 39, by means of a further pulley 42 keyed on the left end of said shaft 43. On the right end of shaft 43 is keyed the roller 13 for driving the endless belt conveyors 10,11. Gear 36 meshes which a gear 98, keyed on the left end of a shaft 99, the task of which will be described later on.

Substantially all the members shown in FIG. 3 are contained within the basement of the wrapping machine 3, and of said members only the shafts 28,43 and the driving roller 13 are shown in FIG. 2.

With particular reference to FIG. 2, the driving roller 13, keyed on shaft 43, is positioned between the upper and lower runs of the endless belts 10,11 and on both sides of said roller there are positioned two parallel idle rollers 45, 46 cooperating with the undersurfaces of the lower runs of said endless belts; this construction allows to continuously drive by friction the belt conveyors 10 and 11 in the direction of arrows f.

On shaft 28 are keyed, starting from left to right viewing FIG. 2, three cams 29,30 and 31, the cam 29 being housed within the casing 16 and the cams 30 and 31 within the cylindrical body 22.

A cam follower 47 engages the groove of the face cam 31 and is carried by one end of a lever 48, the other end of which is keyed on a shaft 49, parallel to shaft 28. The groove of cam 31 is so conformed to impart to shaft 49 an oscillating motion about its axis.

On the left end (viewing FIG. 2) of sahft 49 is keyed one end (upper end) of a lever 50, the other end (lower end) of which is fork shaped and connected, by means of a link 51, to a pin 52 of a sliding member 53. The sliding member 53 is guided by two guide rods 54,55 coplanarly supported by the front and rear walls 20, 21 and are symmetrically disposed relative to the conveyors 10,11 and above the later.

On the opposite sides of the sliding member 53, i.e. on the two sides facing the walls 18 and 19, two vertical sleeves 56 and 57 are secured, each sleeve being provided with a longitudinal slot 58 (only the one relating to the sleeve 56 is shown in FIG. 2).

Hollow shaft 59,60 are mounted for free axial movement into the sleeves 56, 57, said axial movement being guided by square plate members 61, secured to the shafts 59,60 and cooperating with the slots 58. Pins 62 protrude from members 61 each to support an idle roller 63.

A cam follower 64 engages the groove of the face cam 30 and is carried by on end of a lever 65, the other end of which is keyed on the right end (viewing FIG. 2) of a horizontal shaft 66, parallel to shaft 28.

The shaft 66 drives two exactly alike mechanisms, symmetrically disposed relative to a median vertical plane passing through the endless conveyor belts 10 and 11. Of the two mechanisms only one (for example the one shown on the right in FIG. 2) will be thereinafter described, the reference numerals concerning the same parts of the other mechanism being indicated between brackets.

On shaft 66 is keyed one end of a lever 67 (68) on the fork shaped other end of which is mounted, on a pin 69, a block member 70 having a vertical through hole for the free passage of a vertical rod 71 having threaded ends. In order to avoid the withdrawal of rod 71 from the block member 70, on the upper threaded end thereof a nut 72 is screwed on. The other threaded end of rod 71 is screwed into a further block member 73, and around the rod 71 (interposed between the block members 70 and 73) a compressed spring 74 is wound.

A pin 75, parallel to pin 69, protrudes from the block member 73 and engages an arm 76 (77) pivoted in 78 on a bracket 79 secured to the rear wall 21 of casing 16: the arm 76 (77) is, therefore, free to oscillate in a vertical plane parallel to the side walls 18,19.

The arm 76 (77) is provided, on the side thereof facing the sliding member 53, with a longitudinal groove 80 for engaging and guiding the idle roller 63.

The end of arm 76 (77), opposite to the pivot point 78, is provided with a projection or tooth 81 suitably conformed to engage, as it will be explained thereinafter, the end portion of a horizontal rod 82 secured to the keeper of an electromagnet 83 (84) secured on the front wall 20 of casing 16 and at the same level of pivot point 78, protected by a cover 85. A stationary tube element 86, secured on the same front wall 20 inside the casing 16, acts as guiding member of said rod 82 and houses a counteracting spring 87.

The lower ends of shafts 59,60 are each provided with a sucker 88,89 and to the upper portion of said shafts, exiting from the sleeves 56,57, and end of flexible pipes 90,91 is connected, the other ends of which are connected to a slide valve 92 secured to the cover 17 of casing 16. Pipes 93,94 connect the slide valve 92 to a suction source (not shown), and a pipe 95 connects said slide valve 92 to a compressed air source (also not shown).

An idle roller 96, supported by the distributing cylinder 97 of valve 92, engages the outer profile or contour of the cam 29.

Figure 4:
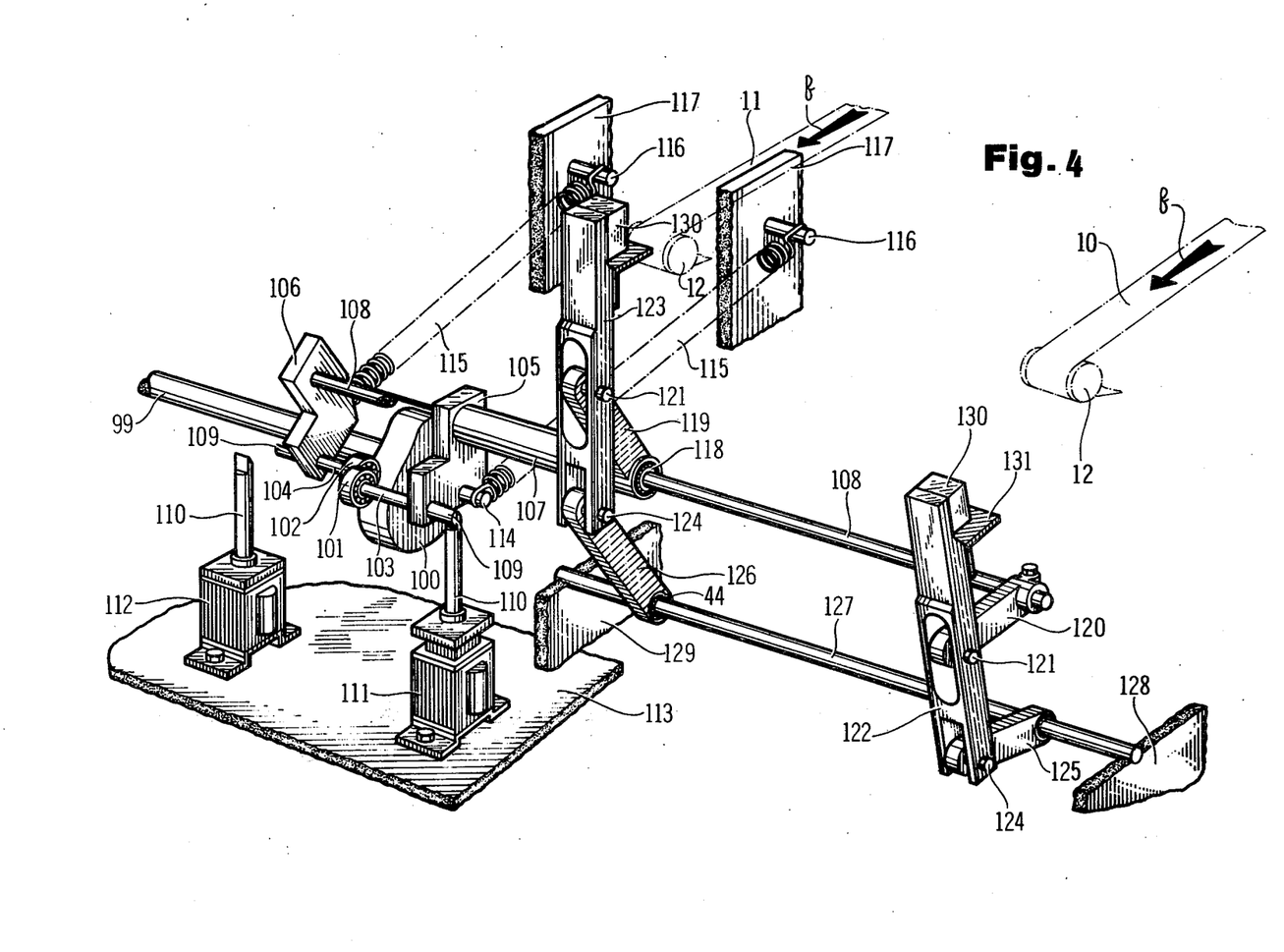
FIG. 4 is a perspective view of a particular, not shown in FIG. 2, of the device according to the invention.

With reference to FIG. 4, on the right end of shaft 99 (as above stated continuously rotated by the gear train 35, 36,98–FIG. 3) a cam 100 is keyed, the outer profile or contour of which cooperates with two idle rollers 101, 102 supported by pins 103, 104, parallel to shaft 99, said pins being part of plate-lever members 105 and 106.

The member 105 is secured to one end of a hollow shaft 107, and the other member 106 is secured to one end of a shaft 108 coaxially disposed, with interposition of ball bearings 118, into the shaft 107. As it clearly appears from FIG. 4, the shafts 107 and 108 are transverse relative to the endless belt conveyors 10 and 11.

On plate-lever members 105 and 106, opposite to pins 103 and 104, there are provided tooth members 109 adapt to be engaged, as it will be described later on, by the upper ends of vertical rods 110 secured to the keepers of electromagnets 111 and 112 supported by a plate 113 making part of the casing 16. Plate-lever members 105,106 are also each provided with a pin 114 engaging one end of a spring 115, the other end of which spring engages a pin 116 secured to a plate 117 making part of casing 16.

Keyed on the other end of shafts 107 and 108 are two link rods 119 and 120 connected, by means of pins 121, to intercepting bars 122 and 123 disposed at the end and in line with the endless belt conveyors 10 and 11.

The lower fork shaped ends of intercepting bars 122,123 are connected, through pins 124, to one end of link rods 125 and 126, the other end of which link rods are rotatably supported, through ball bearings 44, by a common stationary shaft 127 suitably supported on both ends by plates 128, 129 making part of casing 16.

The upper ends of intercepting bars 122,123 are each provided with a pad 130, in elastic and yieldable material, underneath of which a bracket 131 is positioned.

It is clear from the above that during rotation of cam 100 the two intercepting bars 122 and 123 are syncronously and cyclically moved, in a vertical plane normal to shafts 107 and 108, from an operative substantialy vertical intercepting position in which they present the elastic and yieldable pads 130 in front of the end portions of conveyors 10,11 to an inoperative backwardly inclined, or disengaged, position.

Figure 5:
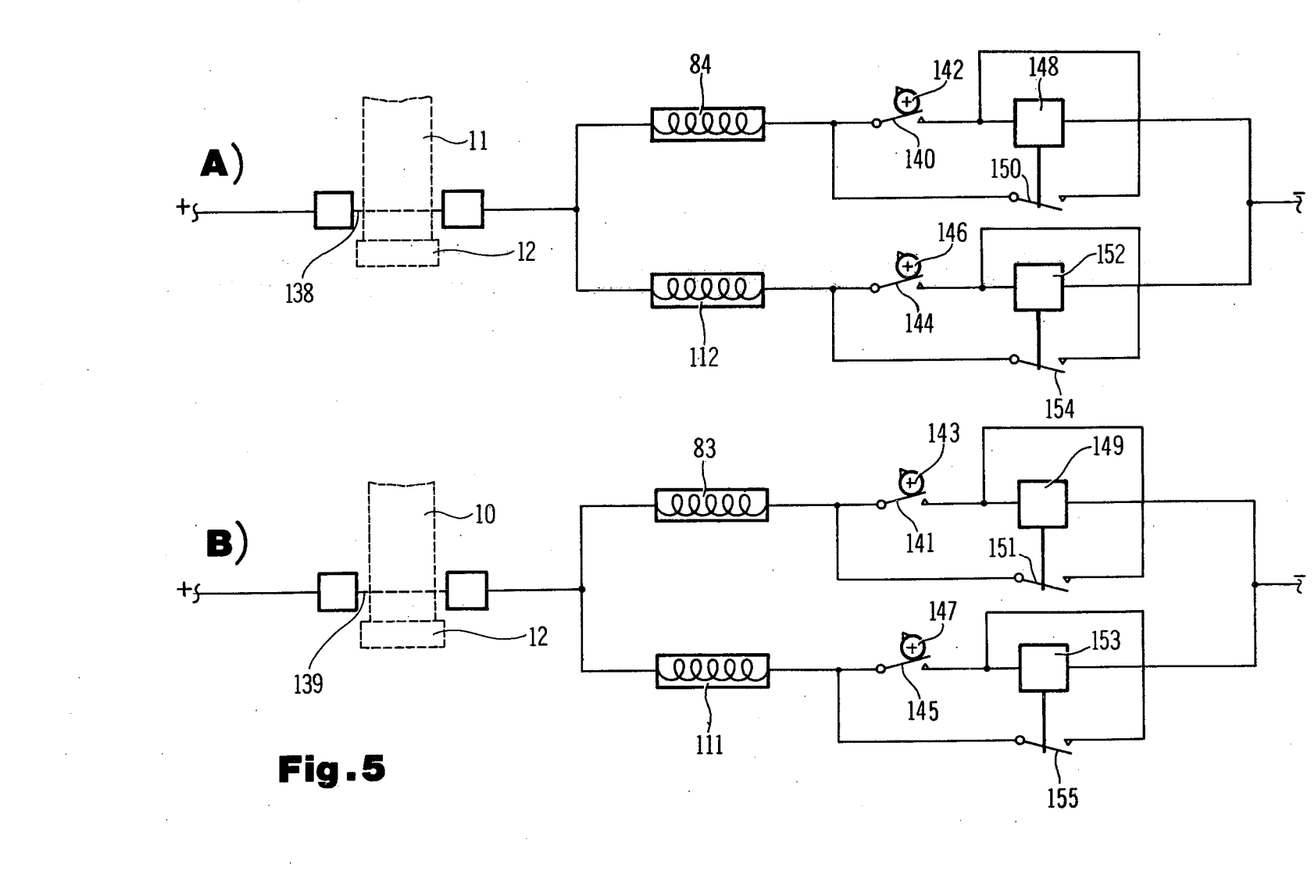
FIG. 5 diagrammatically shows the electric circuit of the device according to the invention.
Figure 6:
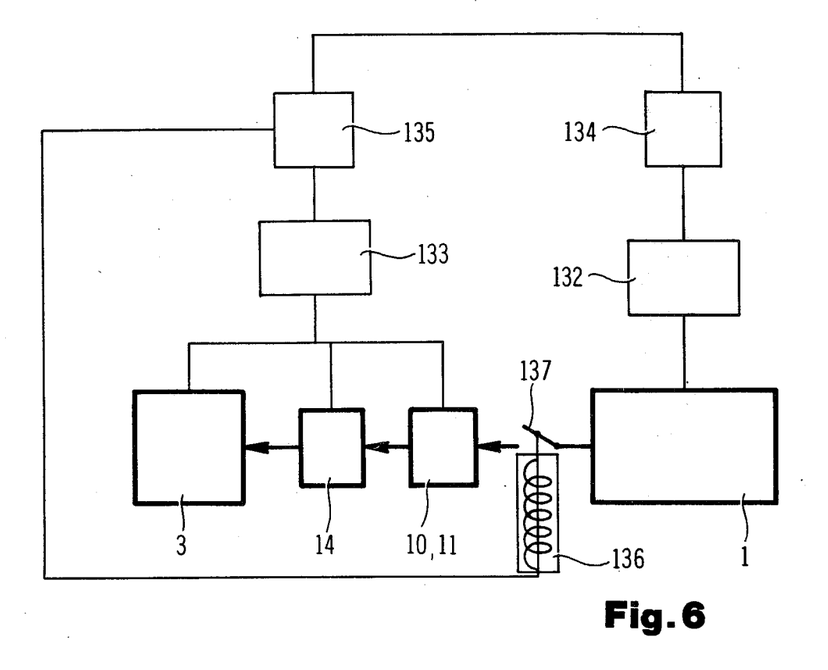
FIG. 6 shows, in a block form, the plant according to FIG. 1 and the related control and driving means.
Figure 7:
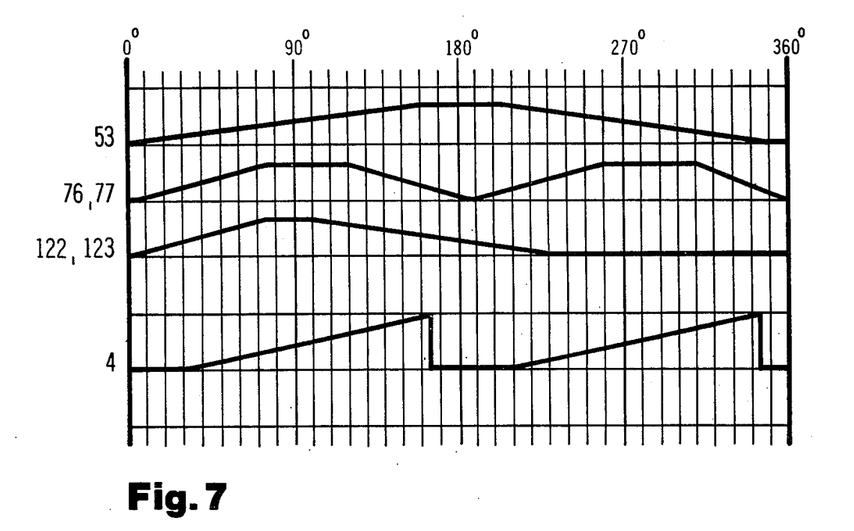
FIG. 7 shows, in the form of graphs plotted relative to a common datum, the motion laws relating to a machine cycle of the most significant parts of the device according to the invention.

For a clear understanding of the operation of the improved transfer device according to the invention, reference should also be made to the electromechanical block diagram of FIG. 6, to the electric circuits of FIG. 5 and to the graphs of FIG. 7.

In FIG. 6 the blocks shown with thick lines indicates the manufacturing machine 1, the endless belt conveyors 10 and 11, the transfer device 14 according to the present invention, and the wrapping machine 3. Said blocks are interconnected by lines provided with arrows indicating the advancement direction of the soap cakes 2.

With the numeral reference 132 is indicated a motor of the manufacturing machine 1, with 133 is indicated a D.C. motor for driving the conveyors 10 and 11, the transfer device 14, and the wrapping machine 3. The block 134 indicates a speedometer dynamo for measuring the speed of motor 132, and the block 135 indicates a circuit assembly connected to the speedometer dynamo 134, to the D.C. motor 133, and to an electromagnet 136 for controlling a device for mechanically cutting off the connection between the blocks 1 and 10,11, said device being schematically shown in the form of a connecting member 137.

The graphs of FIG. 7 represent, in function of the rotation degrees of a common motor shaft (cyclic shaft), the laws that govern the dwells and motions of the most significant members of the transfer device 14. In said graphs the horizontal sections represent the dwelling times, the ascending sections represent the forward motion times, and the descending sections represent the backward motion times of said members.

The electric circuits A and B of FIG. 5 are identical, the circuit A being controlled by a photoelectric cell 138 scanning the endless conveyor 11 in the drawing area of sucker 89, and the circuit B being controlled by a photoelectric cell 139 scanning the endless belt conveyor 10 in the drawing area of sucker 88, both photoelectric cells being so in condition to sense the presence or absence of soap cakes 2 in the concerned area.

Thereinafter reference will be made only to the circuit A of FIG. 5, and the numeral reference relating to the same elements of the other circuit B will be indicated between brackets.

The electric circuit comprises the already mentioned electromagnets 84 (83) and 112 (111) in series connected to the cell 138 (139) and in parallel connected between them. An electric contact 140 (141) is in series connected to the electromagnet 84 (83), and a further electric contact 144 (145) is in series connected to the electromagnet 112 (111), said contacts 140 (141) and 144 (145) being respectively cyclically controlled by cams 142 (143) and 146 (147). The cams 142 (143) and 146 (147) are keyed on a common shaft (cyclic shaft) which is rotated, during any possible operating condition, always for 360° at every machine cycle: for this purpose it can be chosen, for example, the shaft 28.

The contours of cams 142 (143) and 146 (147) are so conformed that the associated contacts are shifted, once per cycle and at the desired time, from their normal open position to their closed position, and then immediately returned to their original (open) position.

In particular, the cam 142 (143) closes the associated contact 140 (141) at the maximum elevation phase of the arm 77 (76), between 260° and 310° of each machine cycle, while the cam 146 (147) closes the associated contact 144 (145) during the dwell of the intercepting bar 123 (122) in the intercepting position, between 230° and 360° of each machine cycle.

The branch comprising the contact 140 (141) recloses itself on the feeding line through a remote control switch 148 (149) which recloses when energized an associated contact 150 (151) in parallel to contact 140 (141). In the same manner the branch comprising the contact 144 (145) recloses itself on the feeding line through a remote control switch 152 (153) which recloses when energized an associated contact 154 (155) in parallel to contact 144 (145).

At the starting up of the plant, i.e. at the starting of motors 132 and 133, the soap cakes produced by the manufacturing machine 1 are not fed to the conveyors 10, 11 since the connecting member 137 is open (see FIG. 6).

This condition lasts until the balancing of the output conditions of the manufacturing and wrapping machines 1 and 3, i.e. until the later machine is in condition of taking up all the soap cakes 2 produced by the manufacturing machine. The task of checking the speed of motor 132 and of sending information to the circuit assembly 135 is entrusted, as above stated, to the speedometer dynamo 134 which—in its turn—sets up the speed of the D.C. motor 133, checks the value thereof and, when the balance between the outputs has been reached, sends an energizing order to the electromagnet 136 which closes the connecting member 137.

This means that the feeding of soap cakes 2 from the manufacturing machine 1 to the conveyors 10 and 11 begins at this time, i.e. at the closing of said connecting member 137.

One soap cake 2 at a time is laid down, by conventional means making part of the manufacturing machine and not shown in the drawings, on each conveyor 10 and 11 thus forming on the later—when operating at normal speed—two trains of equally spaced and in phased relationship soap cakes.

During normal operation, said two trains of soap cakes are advanced by the conveyors 10, 11 in phased relationship with the transfer device 14 so that, at the drawing areas, two soap cakes are simultaneously sucked by suckers 88, 89 and transferred into two contiguous compartments 5 of conveyor 4, the latter being in a dwelling condition.

At arrival of two considered soap cakes 2 near the tailing portions of conveyors 10, 11, the sliding member 53 is at the right end of its previous backward stroke, (viewing FIG. 2), the idle rollers 63 are at the right end of grooves 80, the arms 76, 77 are at their maximum downwardly directed position, and the suckers 88, 89 are near the two considered soap cakes 2. Cam 29, through idle roller 96 and slide valve 92, connects the pipes 90, 91 respectively to pipes 93, 94, thus connecting the suction source to the suckers 88, 89 which suck up said two considered soap cakes 2.

Due to the rotation of cam 31, the sliding member 53 begins its forward stroke (from right to left) and shifts the sleeves 56, 57 towards the conveyor 4. Simultaneously, cam 30 oscillates upwardly the arms 76, 77 until they reach their horizontal position, maintains such arms in said horizontal position for a selected time, and then oscillates them downwardly up to their maximum downwardly directed position. Suckers 88, 89 and the related soap cakes, therefore, are subjected to a composite movement and are firstly progressively upwardly moved till they reach their maximum elevation, horizontally moved at this elevation for a certain length, and downwardly moved until they reach, at the end of the forward stroke of member 53, a position near by the compartments 5 of conveyor 4.

In the meantime, cam 100 moves through the kinematic motion described and shown in FIG. 4, the two intercepting bars 122, 123, from their substantially vertical intercepting position to their inclined disengaged position.

At the end of the forward stroke of sliding member 53, cam 29 shifts the distributing cylinder 97 of valve 92, thus cutting off the connection of pipes 90, 91 with pipes 93, 94, and connects said first pipes 90, 91 with the pipe 95 leading to the compressed air source: the soap cakes 2 are, therefore, quickly discharged from the suckers 88, 89, and laid down into two contiguous dwelling compartments 5 of conveyor 4.

The sliding member 53 reverses its stroke and is returned (backward stroke) towards its starting position, while the intercepting bars 122, 123 are brought back to their intercepting position. During the backward stroke of member 53, arms 76, 77 are oscillated and suckers 88, 89 are firstly upwardly moved, then horizontally moved, and at last downwardly moved for drawing a new pair of soap cakes 2.

During normal operation, i.e. when soap cakes 2 reach the drawing are equally spaced and in phase relationship with the operation of transfer device 14, there is no intervention of the circuits of FIG. 5. As a matter of fact, the contacts (not shown) associated to the photoelectric cells 138, 139 are open there being correctly positioned soap cakes 2 between the senders and the receivers of said cells, and at the cyclic closing of the contacts 140, 144, 141 and 145, associated to cams 142, 146, 143 and 147, the circuits A and B remain de-energized.

Let now one suppose that a considered pair of soap cakes 2, or one soap cake of the pair, reaches the drawing area offset relative to suckers 88, 89, i.e. that said suckers—at arrival of soap cakes to the drawing areas—are still in a position different from the drawing one (sliding member 53 has not reached yet its right end of the backward stroke). This abnormal condition may occur at the starting up of the plant or during unbalanced output between the manufacturing and wrapping machines, and is shown—by way of example—in FIGS. 2 and 4 with reference to conveyor 11 to which the circuit A of FIG. 5 is associated.

Absence of a soap cake 2 between the sender and receiver of cell 138 causes the closing of the contact associated to said cell and therefore, at the cyclic closing of contacts 140 and 144, by means of cams 142 and 146, the circuit A is energized.

The energizing of circuit A, lasting over the reopening of contacts 140 and 141 associated to the remote control switches 148 and 150, excites electromagnet 84 the rod 82 of which engages the projection or tooth 81 of arm 77, as well as excites electromagnet 112 the rod 110 of which engages the end of pin 109 fast to the plate-lever member 105.

Accordingly, in this abnormal operating condition the arm 77 is impeded to downwardly oscillate, since engaged by rod 62, and the sucker 89 moves forward and backward without being subjected to any vertical movement, and the intercepting bar 123 is locked in its intercepting position. The downwardly directed oscillating motion of lever 68 is taken up by spring 74.

When the next soap cake 2 reaches the tailing portion of conveyor 11, it comes into the drawing area of sucker 89 and rests in contact with the pad 130 of the intercepting bar 123 (due to the elastic and yieldable material of said pad 130 the soap cake is not damaged), cuts off the ray of cell 138, and de-energizes electromagnets 84, 112 and remote control switches 148, 152.

At the next machine cycle, the arm 77 is free to oscillate for drawing said next soap cake 2 by means of related sucker 89. The simultaneous shifting of intercepting bar 123 in the disengaged position allows the transferring of the soap cake into one of the compartments 5 of conveyor 4.

It is obvious that the above described abnormal operating condition is repeated any time the photoelectric cells 138, 139 sense offset conditions between the soap cakes and the forward and backward movements of the transfer device 14 according to the invention.

In the embodiment shown the transfer device according to the invention has been described associated to parallel and coplanar conveyors 10, 11 but it is obvious to a man skilled in the art that the claimed improved device can be easily associated to any desired number of conveyors.

Without further analysis, the foregoing will so fully reveal the gist of the present invention that others can, by applying current knowledge, readily adapt it for various applications without omitting features which fairly constitute essential characteristics of the generic and specific aspects of our contribution to the art and, therefore, such adaptations should and are intended to be comprehended within the meaning and range of equivalence to the claims.

What we claim is:

1. An improved transfer device to be used in a plant substantially comprising at least one soft cake-shaped product manufacturing machine and a wrapping machine for successively wrapping said cake-shaped products, a first unidirectionally continuously moved delivery conveyor of the manufacturing machine, a second unidirectionally stepwise moved feeding conveyor of the wrapping machine, and means for regulating the speed of said wrapping machine for balancing the output thereof with the output of the manufacturing machine, said device comprising:

sucker means for transferring the cake shaped products from a drawing area near the tailing portion of said first conveyor to a delivery area near the leading portion of said second conveyor;

intercepting bar means positioned at the end of said first conveyor near said drawing area;

sensor means positioned adjacent said drawing area for sensing the regular sequence of products on said first conveyor;

suction and compression means for cyclically connecting said sucker means alternatively to a suction and compressed air source;

a sliding member reciprocatingly sliding along at least a stationary and horizontal guide means parallel to said first conveyor;

a vertical guide means secured to said sliding member for the vertical shifting of said sucker means;

a first kinematic motion for reciprocatingly sliding said sliding member along said horizontal guide means;

a second kinematic motion for reciprocatingly shifting said sucker means along said vertical guide means;

a locking device for locking said vertical reciprocating shifting of the sucker means on its upwardly directed position when said sensor means detects an irregular sequence of products on said first conveyor; and a third kinematic motion for cyclically shifting said intercepting bar means from a first substantially vertical intercepting position for intercepting the products on said first conveyor to a second inclined disengaged position and viceversa.

2. A device as defined in claim 1, wherein said first kinematic motion comprises a cam keyed on a cyclic shaft and a transmission system connecting said cam to said sliding member.

3. A device as defined in claim 1, wherein said second kinematic motion comprises a second cam keyed on a cyclic shaft, said vertical guiding means secured to said sliding member and having a longitudinal slot, a hollow shaft slidingly mounted within said vertical guiding means and having secured on its lower end said sucker means, a square plate member sideways secured on said hollow shaft and engaging said longitudinal slot, an idle roller mounted on said square plate member and protruding beyond said longitudinal slot, an arm parallel to said first conveyor and pivoted with one end on a stationary pivot point for the oscillation of the other end of said arm from a first position to a downwardly inclined second position, a longitudinal groove on a side surface of said arm adapt to cooperate with said idle roller, and a transmission system resiliently connecting said second cam to said arm.

4. A device as defined in claim 3, wherein said other end of said arm is provided with a toothed projection, opposite to the pivot point and at the same level thereof there being provided an electromagnetic device to engage said toothed projection when an irregular sequence of products on said first conveyor is detected by said sensor means, thus impeding said arm to oscillate downwardly.

5. A device as defined in claim 4, wherein said sensor means comprises a photoelectric cell positioned adjacent said drawing area, and a first electric circuit connecting said electromagnetic device to said photoelectric cell, cam means cyclically closing said first electric circuit.

6. A device as defined in claim 1, wherein said third kinematic motion comprises a cam keyed on a cyclic shaft, a supporting shaft for supporting said intercepting bar, a plate-lever member controlled by said cam and keyed on said supporting shaft, resilient return means for said plate-lever member, a locking tooth supported by said plate-lever member, and an electromagnetic device adapt to engage said locking tooth when an irregular sequence of products on said first conveyor is detected by said sensor means, so as to avoid the return in the second inclined disengaged position of said intercepting bar due to the action of said resilient return means.

7. A device as defined in claim 6, wherein the electromagnetic device makes part of a second electric circuit, cam means cyclically inserting said second electric circuit.

* * * * *